United States Patent
Yan et al.

(10) Patent No.: US 12,207,663 B2
(45) Date of Patent: Jan. 28, 2025

(54) METHOD FOR REDUCING FRUCTAN CONTENT IN FOOD MADE OF RICE AND FLOUR USING MICROWAVE HEATING

(71) Applicants: Jiangnan University, Wuxi (CN); Wuxi HuashunMinsheng Food Co. Ltd., Wuxi (CN); Sichuan Anjoy Food Co. Ltd., Ziyang (CN); Hubei Anjoy Food Co. Ltd., Qianjiang (CN); Henan Anjoy Food Co. Ltd., Anyang (CN)

(72) Inventors: Bowen Yan, Wuxi (CN); Daming Fan, Wuxi (CN); Yejun Wu, Wuxi (CN); Huizhang Lian, Wuxi (CN); Kai Wang, Wuxi (CN); Dongna Ruan, Anyang (CN); Zhongliang Hu, Qianjiang (CN); Chao Chen, Ziyang (CN); Bowen Wang, Wuxi (CN); Siyi Fang, Wuxi (CN); Nana Zhang, Wuxi (CN); Jianxin Zhao, Wuxi (CN); Hao Zhang, Wuxi (CN); Wei Chen, Wuxi (CN)

(73) Assignees: Jiangnan University, Wuxi (CN); Wuxi HuashunMinsheng Food Co. Ltd., Wuxi (CN); Sichuan Anjoy Food Co. Ltd., Ziyang (CN); Hubei Anjoy Food Co. Ltd., Qianjiang (CN); Henan Anjoy Food Co. Ltd., Anyang (CN)

( * ) Notice: Subject to any disclaimer, the term of this patent is extended or adjusted under 35 U.S.C. 154(b) by 371 days.

(21) Appl. No.: 17/870,899

(22) Filed: Jul. 22, 2022

(65) Prior Publication Data

US 2022/0354133 A1 Nov. 10, 2022

Related U.S. Application Data

(63) Continuation of application No. PCT/CN2022/080310, filed on Mar. 11, 2022.

(30) Foreign Application Priority Data

Mar. 11, 2021 (CN) .......................... 2021102635305

(51) Int. Cl.
A21D 8/06 (2006.01)
A21D 10/04 (2006.01)

(52) U.S. Cl.
CPC .............. *A21D 8/06* (2013.01); *A21D 10/04* (2013.01)

(58) Field of Classification Search
CPC .................................. A21D 8/06; A21D 10/04
See application file for complete search history.

(56) References Cited

U.S. PATENT DOCUMENTS 6,579,546 B1 * 6/2003 Jahnke ................... A21D 6/001
426/243
2003/0206994 A1 * 11/2003 Jahnke ................... A21D 6/001
426/19

(Continued)

FOREIGN PATENT DOCUMENTS

| AU | 2018381338 A1 | 7/2020 |
| CN | 111685269 A | 9/2020 |
| CN | 112931773 A | 6/2021 |

OTHER PUBLICATIONS

Kitchen Aid: "Understanding Microwave Wattages: A quick guide". Available online as of 2024, from https://www.kitchenaid.com. pp. 1-9. (Year: 2024).*

(Continued)

*Primary Examiner* — Jenna A Watts
(74) *Attorney, Agent, or Firm* — IPRO, PLLC

(57) ABSTRACT

The present disclosure discloses a method for reducing the fructan content in food made of rice and flour using microwave heating and belongs to the technical field of food processing. Fermented products made of rice and flour are (Continued)

prepared using microwave heating and fructan in the products can be effectively degraded. Compared with traditional steaming, the method can remarkably reduce the fructan content in the fermented food, effectively alleviate the bowel stress sensitivity to the fermented rice and flour food by patients with irritable bowel syndrome (IBS), meet the daily dietary requirements of special crowds, has the advantages of simple process, green processing and environmental protection, and is suitable for large-scale industrial production.

9 Claims, 2 Drawing Sheets

(56) References Cited

U.S. PATENT DOCUMENTS

2016/0330980 A1* 11/2016 Pearce ................ A21D 10/005
2020/0205425 A1 7/2020 Courtin et al.
2020/0214301 A1 7/2020 Cker et al.

OTHER PUBLICATIONS

Fang, Siyi "Study on the Effect of Sourdough Fermentation combined with Microwave heating on the Level of FODMAPs in sponge cakes" 2021 Jiangnan Univ Master Thesis Jan. 15, 2022.

* cited by examiner

METHOD FOR REDUCING FRUCTAN CONTENT IN FOOD MADE OF RICE AND FLOUR USING MICROWAVE HEATING

TECHNICAL FIELD

The present disclosure relates to a method for reducing the content of fructan in food made of rice and flour using microwave heating and belongs to the technical field of food processing.

BACKGROUND

FODMAPs include fermentable oligosaccharides, disaccharides, monosaccharides, and polyols. The ingestion of the FODMAPs may have adverse effects on patients with irritable bowel syndrome (IBS), whose mechanisms of action are mainly: the FODMAPs enable water to permeate and stay in the intestinal lumen, can be rapidly fermented to produce gas under action of intestinal bacteria, and cause intestinal distension, swelling and discomfort, along with other peripheral and central inducing factors that contribute to gastrointestinal symptoms such as pain, abdominal distension, nausea and a poor bowel evacuation habit. Fructan, as a fermentable oligosaccharide, is a typical substance of the FODMAPs and widely present in cereal foods. For example, the content of fructan accounts for about 60-90% of the total amount of the FODMAPs in wheat and the fructan is the most representative substance of the FODMAPs in wheat-based products. Food made of rice and flour is an important part of the Chinese dietary structure and a nutrient-enriched staple food. However, the content of fructan of the food made of rice and flour is far beyond the critical value of ingestion (0.3 g/meal) by patients with IBS. If intake of the rice and flour food is avoided, nutritional deficiency is easily caused. Therefore, it is necessary to reduce the content of fructan.

Three main existing methods for reducing fructan in food include: 1, raw material varieties with low fructan content are selected to process and manufacture products, such as Spelt Wheat whose fructan content is lower than that of Hard Red Spring wheat, Soft White Winter wheat, and other modern wheat varieties, specially Spelt bread with the low content of fructan can be manufactured; 2, different food processing methods can affect the content of fructan in products, for example, the water-soluble fructan in products is dissolved out after heating in the water bath, resulting in a significant decrease in the fructan content of the products; and 3, using biological fermentation technology to reduce the content of fructan in wheat-based products. Studies by Struyf N et al. (Food Microbiol, 2018, 76 (DEC.): 135-145) have shown that the content of fructan in bread prepared by 2.5 h of fermentation with *Kluyveromyces marxianus* can be reduced by more than 90%, but the *K. marxianus* is usually required to be fermented in cooperation with *Saccharomyces cerevisiae* due to its insufficient gas production; and the results of Fraberger V et al. (Nutriments, 2018, 10(9): 1247) indicated that the content of fructan in bread was also reduced by fermenting with *S. cerevisiae* separated from traditional sourdough, while in order to achieve a sufficient degradation effect, it was necessary to extend the fermentation time, which would lead to long production time, tedious production process and deterioration of product quality.

It is the most direct and effective method to degrade the fructan in the wheat-based food by changing processing modes, but the traditional water-bath heating is not suitable for processing the food made of rice and flour. Therefore, a novel processing method aiming at the low-FODMAPs rice and flour food is explored. It is one of problems needed to be solved for realizing industrial production of special staple food for patients with IBS to effectively assist degrading the fructan and ensure an economic, efficient, clean and environment-friendly production process.

SUMMARY

Technical Problems

The present disclosure prepares fermented food made of rice and flour through a specific microwave power and heating time, and can effectively degrade fructan in the fermented rice and flour food. Compared with steaming of traditional fermented food, the method can remarkably reduce the content of the fructan in the fermented food, effectively alleviate the bowel stress sensitivity of patients with irritable bowel syndrome (IBS) to the fermented rice and flour food, enable a product to have an excellent flavor, meet the daily diet requirements of special crowds, and is feasible for industrialization in the production process.

Technical Solutions

The purpose of the present disclosure is to provide a method for reducing the content of fructan in food made of rice and flour by microwave heating, and the method includes the following steps:

(1) uniformly mixing flour, active dry yeast and water to form a batter; placing the batter in a mold for proofing; and (2) placing the fermented batter in a microwave oven for heating.

In one embodiment of the present disclosure, the ratio of the parts by weight of the flour, the active dry yeast and the water is (180-220) portions:(2-3) portions:(120-160) portions.

In one embodiment of the present disclosure, in step (2), the proofing is performed at a temperature of 30-40° C. and a humidity of 70-90% RH. The proofing time is 40-60 min.

In one embodiment of the present disclosure, in step (2), the batter is weighed at a mass of 90-110 portions.

In one embodiment of the present disclosure, in step (3), the microwave is performed at a power of 4.0-5.5 w/g, preferably 4.0-5.1 w/g; the microwave heating time is 2-3 min, specifically optionally 3 min.

In one embodiment of the present disclosure, the batter further includes adding 0.8-1.2 portions by weight of baking powder.

In one embodiment of the present disclosure, the batter further includes an invertase. The invertase is a commercial invertase (EC 3.2.1.26, sourced from *S. cerevisiae*). The amount of the invertase relative to the flour is 20-40 U/g, specifically optionally 30 U/g.

In one embodiment of the present disclosure, the flour can be selected from wheat flour; and the active dry yeast can be selected from commercially available Angel highly active dry yeast (golden-package).

In one embodiment of the present disclosure, the food made of rice and flour include a steamed sponge cake.

The present disclosure further provides low-fructan-content rice and flour food using the method, wherein the content of the fructan in the food is reduced to less than 0.3 g/100 g DM.

The method further provides a method for preparing a steamed sponge cake, where the method includes the following steps:

(1) Preparation of Steamed Sponge Cake Batter:

weighing 180-220 portions by weight of wheat flour, 2.0-2.8 portions of active dry yeast, and 0.8-1.2 portions of baking powder, stirring and uniformly mixing the materials in a stirring tank at a low speed, adding 120-160 portions of warm water, stirring the materials in the stirring tank at a low speed until the materials were viscous, and then stirring the materials at a high speed for 10-14 min to obtain a batter of a steamed sponge cake; and (2) Proofing and Heating of Steamed Sponge Cake Batter:

weighing 90-110 portions of the steamed sponge cake batter obtained in step (1), placing the batter in a mold to be oscillated to exhaust, performing proofing at a temperature of 30-40° C. and a humidity of 70-90% RH for 40-60 min, then placing the batter of a steamed sponge cake in a microwave tunnel heating device and performing heating using microwaves of different powers (4.0-5.1 w/g) for 2-3 min and naturally cooling for 4-8 min to obtain a steamed sponge cake with low fructan content.

Beneficial Effects:

1. Effectively reduce the content of fructan in a product: the method for preparing a steamed sponge cake using microwave heating realize the effect of fructan degradation, the fructan content in the obtained microwave steamed sponge cake is lower than critical value of ingestion (0.3 g/100 g DM) by patients with IBS and can be as low as 0.166 g/100 g DM, and the sensory quality of the product is better than that obtained by a traditional heating method.

2. Shorten production time: the method for preparing a steamed sponge cake using microwave heating speed up the heating process of the steamed sponge cake, at the same time does not require long-time fermentation, and has the advantages of short production time, simple process and high production efficiency.

3. Suitable for industrialized production: the method for preparing a steamed sponge cake using microwave heating has a sensitive response, and is timely to control and suitable for automatic and continuous production.

4. Energy-saving, environmentally-protective, clean, and hygienic: the method for preparing a steamed sponge cake using microwave heating has a small occupied area for heating, avoids high temperature of the environment, and is free of pollution.

DETAILED DESCRIPTION

Figure 1:
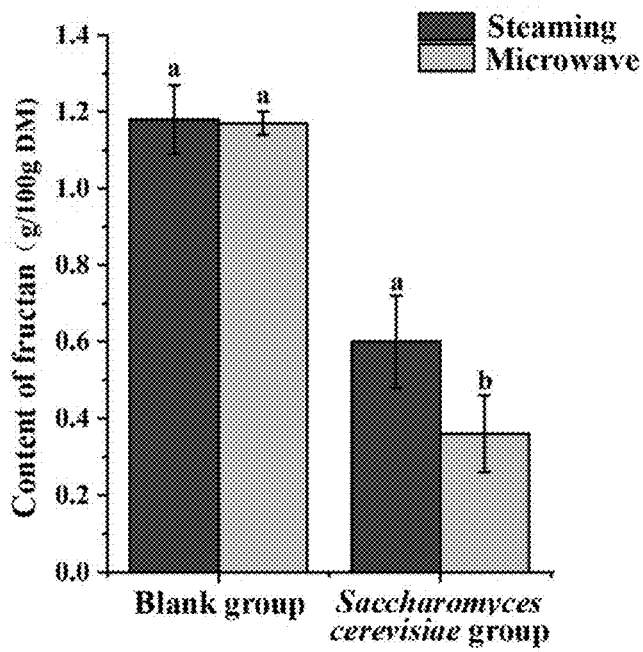
FIG. 1 is a graph comparing the fructan content in the steamed sponge cakes obtained in Example 1 and Comparative Examples 1-3.

An assay and analysis method of the content of fructan involved in the present disclosure is as follows:

(1) Sample processing: a steamed sponge cake is cooled to room temperature and freeze-dried in a freeze dryer, and the freeze-dried steamed sponge cake is pulverized using an IKA pulverizer for 3 consecutive times with 5 s each time to obtain a pulverized steamed sponge cake sample.

(2) Fructan assay: the total fructan content in the sample is determined using a Megazyme Fructan HK enzyme assay kit (Megazyme, Bray, Ireland). The enzyme assay is based on established standard methods (AOAC method 999.03 and AACC method 32.32.01).

An assay and analysis method of springiness, resilience, chewiness and hardness of the steamed sponge cake involved in the present disclosure is as follows:

The obtained steamed sponge cake is subjected to a texture profile analysis. The specific operation is as follows: probe, P/36R; pre-test speed, 1.00 mm/s; test speed, 1.70 mm/s; post-test speed, 1.00 mm/s; strain, 40%; trigger force, 5 g; interval time, 5 s; and compression for twice. Each batch of the samples is repeated 3 times.

1 portion by weight involved in the following examples represents 1 g.

Baking powder involved in the present disclosure is a compound raising agent, which is a white powder prepared by soda powder with acidic material and using corn starch as filler, and also known as foaming powder or dough raising powder.

The humidity involved in the present disclosure specifically refers to a relative humidity whose unit is % RH.

The active dry yeast involved in the present disclosure refers to a dry yeast product that still maintains a strong fermentation ability after pressing, drying, and dehydrating from specially cultivated fresh yeast. The pressed yeast is extruded into thin strips or small balls, and continuously dried through a fluidized bed with low-humidity circulating air, such that a final fermentation moisture reaches about 8% and the fermentation ability of the yeast is maintained.

The active dry yeast involved in the present disclosure is a golden-packed dry yeast with high sugar tolerance and high activity and can be purchased from Angel Yeast Co., Ltd., Yichang, Hubei, China. The baking powder is RUMFORD aluminum-free baking powder and can be purchased from Clabber Girl Company, Indiana, USA.

Low-speed stirring involved in the present disclosure is performed using a 1st gear of a Kenwood KM020 chef machine; and high-speed stirring is performed using a 6th gear of the Kenwood KM020 chef machine.

Example 1 Microwave Steamed Sponge Cake Prepared Using Commercial Active Dry Yeast Fermentation (1) Preparation of Steamed Sponge Cake Batter:

200 g of wheat flour, 2.4 g of active dry yeast (golden-packed dry yeast with high sugar tolerance and high activity, Angel Yeast Co., Ltd., Yichang, Hubei, China) and 1 g of baking powder (RUMFORD aluminum-free baking powder, Clabber Girl Company, Indiana, USA) were weighed, the materials were stirred and uniformly mixed in a stirring tank at a low speed (1st gear of a Kenwood KM020 chef machine), 140 g of warm water was added, and the materials were stirred in the stirring tank at a low speed (1st gear of a Kenwood KM020 chef machine) until the materials were viscous and stirred at a high speed (6th gear of the Kenwood KM020 chef machine) for 12 min obtain the batter of a steamed sponge cake; and (2) Proofing and Heating of Steamed Sponge Cake Batter:

100 g of the steamed sponge cake batter obtained in step (1) was weighed, the batter was placed in a mold to be oscillated to exhaust, and proofing was performed at a temperature of 37° C. and a humidity of 85% RH for 40 min, the fermented batter was placed in a microwave tunnel heating device to be heated at a microwave power of 4.25 w/g for 2 min and then naturally cooled for 5 min to obtain a steamed sponge cake with low fructan content.

Example 2 Microwave Steamed Sponge Cake Prepared Using Commercial Active Dry Yeast Fermentation Specific steps were as follows:

(1) Preparation of Steamed Sponge Cake Batter:

200 g of wheat flour, 2.4 g active dry yeast, and 1 g of baking powder were weighed, the materials were stirred and uniformly mixed in a stirring tank at a low speed, 140 g of warm water was added, the materials were stirred in the stirring tank at a low speed until the materials were viscous, and the materials were stirred at a high speed for 12 min to obtain the batter of a steamed sponge cake; and (2) Proofing and Heating of Steamed Sponge Cake Batter:

100 g of the steamed sponge cake batter obtained in step (1) was weighed, the batter was placed in a mold to be oscillated to exhaust, and proofing was performed at a temperature of 37° C. and a humidity of 85% RH for 40 min, the fermented batter was placed in a microwave tunnel heating device to be heated at a microwave power of 3.4 w/g for different heating time (1 min, 2 min, 3 min, and 5 min) and then naturally cooled for 5 min to obtain the steamed sponge cake with low fructan content.

Example 3 Microwave Steamed Sponge Cake Prepared Using Commercial Active Dry Yeast Fermentation Specific steps were as follows:

(1) Preparation of Steamed Sponge Cake Batter:

200 g of wheat flour, 2.4 g active dry yeast, and 1 g of baking powder were weighed, the materials were stirred and uniformly mixed in a stirring tank at a low speed, 140 g of warm water was added, the materials were stirred in the stirring tank at a low speed until the materials were viscous, and the materials were stirred at a high speed for 12 min to obtain the batter of a steamed sponge cake; and (2) Proofing and Heating of Steamed Sponge Cake Batter:

100 g of the steamed sponge cake batter obtained in step (1) was weighed, the batter was placed in a mold to be oscillated to exhaust, and proofing was performed at a temperature of 37° C. and a humidity of 85% RH for 40 min, the fermented batter was placed in a microwave tunnel heating device to be heated at a microwave power of 4.25 w/g for different heating time (1 min, 2 min, 3 min, and 5 min) and then naturally cooled for 5 min to obtain the steamed sponge cake with low fructan content.

Example 4 Microwave Steamed Sponge Cake Prepared Using Commercial Active Dry Yeast Fermentation Specific steps were as follows:

(1) Preparation of Steamed Sponge Cake Batter:

200 g of wheat flour, 2.4 g active dry yeast, and 1 g of baking powder were weighed, the materials were stirred and uniformly mixed in a stirring tank at a low speed, 140 g of warm water was added, the materials were stirred in the stirring tank at a low speed until the materials were viscous, and the materials were stirred at a high speed for 12 min to obtain the batter of a steamed sponge cake; and (2) Proofing and Curing of Steamed Sponge Cake Batter:

100 g of the steamed sponge cake batter obtained in step (1) was weighed, the batter was placed in a mold to be oscillated to exhaust, and proofing was performed at a temperature of 37° C. and a humidity of 85% RH for 40 min, the fermented batter was placed in a microwave tunnel heating device to be heated at a microwave power of 5.1 w/g for different heating time (1 min, 2 min, 3 min, and 5 min) and then naturally cooled for 5 min to obtain the steamed sponge cake with low fructan content.

Example 5 Microwave Steamed Sponge Cake Prepared by Adding Commercial Invertase for Fermentation Specific steps were as follows:

(1) Preparation of Steamed Sponge Cake Batter:

200 g of wheat flour, 2.4 g active dry yeast, and 1 g of baking powder were weighed, 6,000 U of a commercial invertase (Invertase, EC 3.2.1.26, 14504 from *S. cerevisiae*) was added, the materials were stirred and uniformly mixed in a stirring tank at a low speed, 140 g of warm water was added, the materials were stirred in the stirring tank at a low speed until the materials were viscous, and the materials were stirred at a high speed for 12 min to obtain the batter of a steamed sponge cake; and (2) Proofing and Heating of Steamed Sponge Cake Batter:

100 g of the steamed sponge cake batter obtained in step (1) was weighed, the batter was placed in a mold to be oscillated to exhaust, and proofing was performed at a temperature of 37° C. and a humidity of 85% RH for 40 min, the fermented batter was placed in a microwave tunnel heating device to be heated at a microwave power of 4.25 w/g for different heating time (1 min, 2 min, 3 min, and 5 min) and then naturally cooled for 5 min to obtain the steamed sponge cake with low fructan content.

Comparative Example 1 Steamed Sponge Cake Prepared not Using Commercial Active Dry Yeast Fermentation Specific steps were as follows:

(1) Preparation of Steamed Sponge Cake Batter:

200 g of wheat flour, and 1 g of baking powder were weighed, the materials were stirred and uniformly mixed in a stirring tank at a low speed, 140 g of warm water was added, the materials were stirred in the stirring tank at a low speed until the materials were viscous, and the materials were stirred at a high speed for 12 min to obtain the batter of a steamed sponge cake; and (2) Proofing and Steaming of Steamed Sponge Cake Batter:

100 g of the steamed sponge cake batter obtained in step (1) was weighed, the batter was placed in a mold to be oscillated to exhaust, and proofing was performed at a temperature of 37° C. and a humidity of 85% RH for 40 min, the fermented batter was placed in a cooking cabinet to be heated for 15 min and then naturally cooled for 5 min to obtain the steamed sponge cake of a blank group.

Comparative Example 2 Microwave Steamed Sponge Cake Prepared not Using Commercial Active Dry Yeast Fermentation Specific steps were as follows:
(1) Preparation of Steamed Sponge Cake Batter:
200 g of wheat flour, and 1 g of baking powder were weighed, the materials were stirred and uniformly mixed in a stirring tank at a low speed, 140 g of warm water was added, the materials were stirred in the stirring tank at a low speed until the materials were viscous, and the materials were stirred at a high speed for 12 min to obtain the batter of a steamed sponge cake; and
(2) Proofing and Heating of Steamed Sponge Cake Batter:
100 g of the steamed sponge cake batter obtained in step (1) was weighed, the batter was placed in a mold to be oscillated to exhaust, and proofing was performed at a temperature of 37° C. and a humidity of 85% RH for 40 min, the fermented batter was placed in a microwave tunnel heating device to be heated at a microwave power of 4.25 w/g for 2 min and then naturally cooled for 5 min to obtain the microwave steamed sponge cake of a blank group.

Comparative Example 3 Steamed Sponge Cake Prepared Using Commercial Active Dry Yeast Fermentation Specific steps were as follows:
(1) Preparation of Steamed Sponge Cake Batter:
200 g of wheat flour, 2.4 g active dry yeast, and 1 g of baking powder were weighed, the materials were stirred and uniformly mixed in a stirring tank at a low speed, 140 g of warm water was added, the materials were stirred in the stirring tank at a low speed until the materials were viscous, and the materials were stirred at a high speed for 12 min to obtain the batter of a steamed sponge cake; and
(2) Proofing and Steaming of Steamed Sponge Cake Batter:
100 g of the steamed sponge cake obtained in step (1) was weighed, the batter was placed in a mold to be oscillated to exhaust, and proofing was performed at a temperature of 37° C. and a humidity of 85% RH for 40 min, the fermented batter was placed in a cooking cabinet to be heated for 15 min and then naturally cooled for 5 min to obtain the steamed sponge cake of a S. cerevisiae group.

Characteristics Comparison and Mechanism Exploration:
The content of fructan in the steamed sponge cakes obtained in Comparative Examples 1-3 and Example 1 was compared as shown in FIG. 1. Compared with the steamed sponge cake of a blank group, the fructan content of the microwave steamed sponge cake of a blank group did not decrease significantly, indicating that the effect of the heating methods on the fructan reduction was not significant without the addition of S. cerevisiae. After the S. cerevisiae was added, the content of fructan of the steamed sponge cake decreased obviously. Besides, the fructan content of the microwave steamed sponge cake was relatively lower compared with that of the traditionally steamed sponge cake, indicating that microwave heating can assist S. cerevisiae to further degrade the fructans in the steamed sponge cake.

Figure 2:
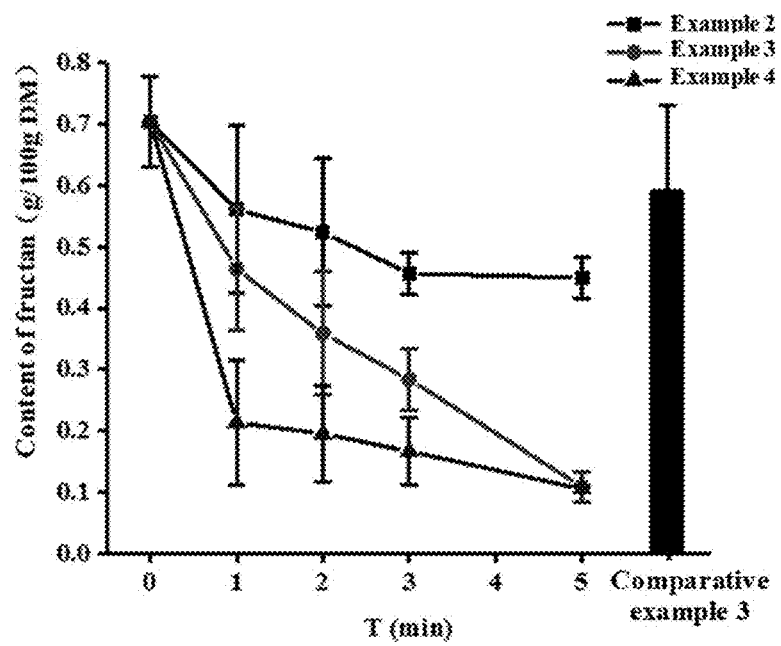
FIG. 2 is a graph comparing the fructan content in the steamed sponge cakes prepared by different microwave processes.

The assisted degradation of the microwave was affected by its heating processing parameters. The fructan content of the microwave steamed sponge cakes prepared with different microwave powers (3.40 w/g-5.10 w/g) and heating times (1 min-5 min) was compared separately as shown in FIG. 2 and Table 1. With the increase of the microwave powers and heating times, the fructan content of the steamed sponge cakes showed a decreasing trend. When the microwave power was greater than 4.25 w/g and the heating time exceeded 2 min, the content of fructan in the steamed sponge cake decreased to a level below 0.3 g/100 g DM (critical value of fructan ingestion by patients with IBS). It was speculated that the microwave may affect the fructan content in the steamed sponge cakes through rapid heating effect.

In order to further explore the influence mechanism of microwave-assisted S. cerevisiae on degrading fructan, a commercial invertase (EC 3.2.1.26, sourced from S. cerevisiae) was added on the basis of S. cerevisiae as the fermentation agent (Table 1). Under the hydrolysis of the invertase, the fructan content in the microwave steamed sponge cake continued to decrease, indicating that microwave heating may further degrade the fructan by affecting the activity of fructan-degrading enzyme in the fermentation agent.

Figure 3A:
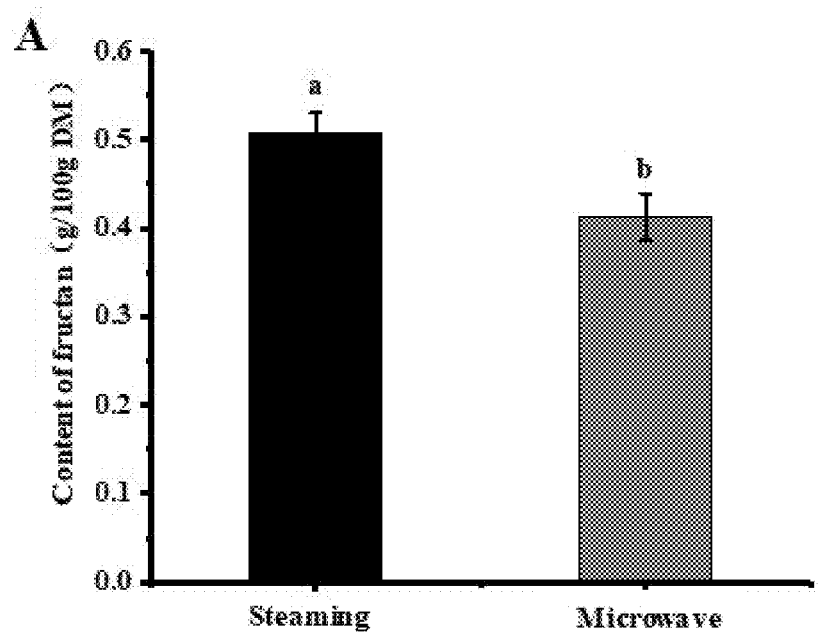
FIG. 3A shows the fructan content in the steamed sponge cakes obtained by different heating methods at the same heating rate.
Figure 3B:
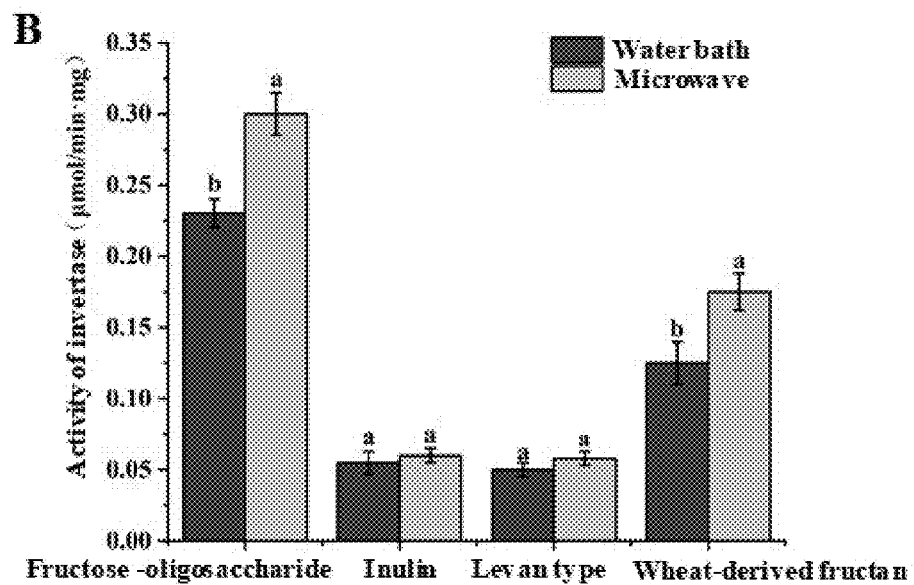
FIG. 3B shows the invertase activity of the steamed sponge cakes obtained by different heating methods at the same heating rate.

To verify conjectures of the microwave rapid heating and the microwave heating cooperated with invertase on hydrolyzing the fructan, an isothermal and constant rate model was constructed to analyze and compare the difference of invertase activity between microwave heating and water bath heating. As shown in FIG. 3B, under the same heating rate, the microwave heating can moderately increase the activity of the invertase compared with traditional waterbath heating, and the invertase can promote the hydrolysis of the fructan with a specific degree of polymerization under the action of the microwave.

TABLE 1

Content of fructan of steamed sponge cakes obtained using different heating methods

| | | Content of fructan (g/100 g DM) |
|---|---|---|
| Not heated (0 min) | | 0.705 ± 0.074 |
| Comparative Example 3 (steaming) | | 0.590 ± 0.141 |
| Example 2 | 1 min | 0.561 ± 0.137 |
| (3.4 w/g) | 2 min | 0.523 ± 0.120 |
| | 3 min | 0.456 ± 0.034 |
| | 5 min | 0.450 ± 0.034 |
| Example 3 | 1 min | 0.464 ± 0.100 |
| (4.25 w/g) | 2 min | 0.359 ± 0.101 |
| | 3 min | 0.284 ± 0.050 |
| | 5 min | 0.109 ± 0.025 |
| Example 4 | 1 min | 0.213 ± 0.102 |
| (5.1 w/g) | 2 min | 0.195 ± 0.078 |
| | 3 min | 0.166 ± 0.055 |
| | 5 min | 0.105 ± 0.005 |
| Example 5 | 1 min | 0.346 ± 0.016 |
| (4.25 w/g, invertase) | 2 min | 0.279 ± 0.019 |
| | 3 min | 0.155 ± 0.003 |
| | 5 min | 0.121 ± 0.017 |

The microwave heating and the degradation of fructan also had an impact on texture properties of the steamed sponge cakes. The steamed sponge cakes obtained in Comparative Example 3 and Examples 2-5 were subjected to a texture profile analysis, and the results were shown in Table 2. When the heating time was performed for 1 min, the steamed sponge cakes obtained in Examples 2-5 were not fully cooked. When the heating time was performed for 5 min, the steamed sponge cakes obtained in Examples 3-5 were dried and dehydrated due to excessive heating, which were not suitable to be tested and were not edible. The results showed that the microwave power and the heating time within a certain range had no obvious effect on the springiness of the steamed sponge cakes; the resilience of the steamed sponge cakes was negatively correlated with the microwave power and the heating time; with the increase of the microwave power and the heating time, the steamed sponge cakes chewiness increased gradually; but due to the decrease of moisture content, hardness of the steamed sponge cakes increased significantly with the microwave power and the heating time increasing, and the texture characteristics of the microwave steamed sponge cakes were better than those of traditionally steamed sponge cakes under certain heating conditions. In addition, the quality of the steamed sponge cakes was also correlated with the content of fructan. Excessive microwave heating and the decrease of the fructan content would lead to deterioration of the product texture. Therefore, the method of the present disclosure preferably using the microwave heating process can prepare the low-fructan-content microwave steamed sponge cakes with better quality.

TABLE 2

Texture profile analysis results of steamed sponge cakes obtained using different heating methods

| | | Springiness | Resilience | Chewiness | Hardness (g) |
|---|---|---|---|---|---|
| Comparative Example 3 (steaming) | | $0.641 \pm 0.067$ | $0.224 \pm 0.028$ | $293 \pm 34$ | $809 \pm 21$ |
| Example 1 (3.4 w/g) | 1 min | Not fully cooked | | | |
| | 2 min | $0.960 \pm 0.015$ | $0.508 \pm 0.018$ | $703 \pm 45$ | $852 \pm 59$ |
| | 3 min | $0.948 \pm 0.016$ | $0.474 \pm 0.010$ | $997 \pm 83$ | $1254 \pm 100$ |
| | 5 min | $0.941 \pm 0.012$ | $0.409 \pm 0.033$ | $2159 \pm 452$ | $2791 \pm 627$ |
| Example 2 (4.25 w/g) | 1 min | Not fully cooked | | | |
| | 2 min | $0.984 \pm 0.016$ | $0.503 \pm 0.014$ | $613 \pm 82$ | $735 \pm 107$ |
| | 3 min | $0.976 \pm 0.007$ | $0.493 \pm 0.016$ | $717 \pm 76$ | $865 \pm 91$ |
| | 5 min | Dry and hard after dehydration and no data detected | | | |
| Example 3 (5.1 w/g) | 1 min | Not fully cooked | | | |
| | 2 min | $0.961 \pm 0.007$ | $0.480 \pm 0.019$ | $1078 \pm 119$ | $1321 \pm 159$ |
| | 3 min | $0.950 \pm 0.005$ | $0.417 \pm 0.037$ | $1475 \pm 293$ | $1860 \pm 386$ |
| | 5 min | Dry and hard after dehydration and no data detected | | | |
| Example 5 (4.25 w/g, invertase) | 1 min | Not fully cooked | | | |
| | 2 min | $0.937 \pm 0.017$ | $0.471 \pm 0.010$ | $1224 \pm 89$ | $1520 \pm 131$ |
| | 3 min | $0.944 \pm 0.020$ | $0.456 \pm 0.025$ | $1525 \pm 225$ | $1921 \pm 346$ |
| | 5 min | Dry and hard after dehydration and no data detected | | | |

Example 6 Microwave Steamed Sponge Cake Prepared Using Commercial Active Dry Yeast Fermentation Specific steps were as follows:

(1) Preparation of Steamed Sponge Cake Batter:

180 g of wheat flour, 2.2 g active dry yeast, and 0.8 g of baking powder were weighed, the materials were stirred and uniformly mixed in a stirring tank at a low speed, 130 g of warm water was added, the materials were stirred in the stirring tank at a low speed until the materials were viscous, and the materials were stirred at a high speed for 12 min to obtain the batter of a steamed sponge cake; and (2) Proofing and Heating of Steamed Sponge Cake Batter:

100 g of the steamed sponge cake batter obtained in step (1) was weighed, the batter was placed in a mold to be oscillated to exhaust, and proofing was performed at a temperature of 37° C. and a humidity of 85% RH for 40 min, the fermented batter was placed in a microwave tunnel heating device to be heated at a microwave power of 4.25 w/g for 2 min and then naturally cooled for 5 min to obtain the steamed sponge cake with low fructan content.

Example 7 Microwave Steamed Sponge Cake Prepared Using Commercial Active Dry Yeast Fermentation Specific steps were as follows:

(1) Preparation of Steamed Sponge Cake Batter:

220 g of wheat flour, 2.7 g active dry yeast, and 1.2 g of baking powder were weighed, the materials were stirred and uniformly mixed in a stirring tank at a low speed, 150 g of warm water was added, the materials were stirred in the stirring tank at a low speed until the materials were viscous, and the materials were stirred at a high speed for 12 min to obtain the batter of a steamed sponge cake; and (2) Proofing and Heating of Teamed Sponge Cake Batter:

100 g of the steamed sponge cake batter obtained in step (1) was weighed, the batter was placed in a mold to be oscillated to exhaust, and proofing was performed at a temperature of 37° C. and a humidity of 85% RH for 40 min, the fermented batter was placed in a microwave tunnel heating device to be heated with microwave at a power of 4.25 w/g for 3 min and then naturally cooled for 5 min to obtain the steamed sponge cake with low fructan content.

Example 8 Microwave Steamed Sponge Cake Prepared Using Commercial Active Dry Yeast Fermentation Specific steps were as follows:

(1) Preparation of Steamed Sponge Cake Batter:

210 g of wheat flour, 2.8 g active dry yeast, and 1.1 g of baking powder were weighed, the materials were stirred and uniformly mixed in a stirring tank at a low speed, 160 g of warm water was added, the materials were stirred in the stirring tank at a low speed until the materials were viscous, and the materials were stirred at a high speed for 12 min to obtain the batter of a steamed sponge cake; and (2) Proofing and Heating of Steamed Sponge Cake Batter:

100 g of the steamed sponge cake batter obtained in step (1) was weighed, the batter was placed in a mold to be oscillated to exhaust, and proofing was performed at a temperature of 37° C. and a humidity of 85% RH for 40 min, the fermented batter was placed in a microwave tunnel heating device to be heated at a microwave power of 5.1 w/g for 2 min and then naturally cooled for 5 min to obtain the steamed sponge cake with low fructan content.

Example 9 Microwave Steamed Sponge Cake Prepared Using Commercial Active Dry Yeast Fermentation Specific steps were as follows:
(1) Preparation of Steamed Sponge Cake Batter:
190 g of wheat flour, 2 g active dry yeast, and 0.9 g of baking powder were weighed, the materials were stirred and uniformly mixed in a stirring tank at a low speed, 120 g of warm water was added, the materials were stirred in the stirring tank at a low speed until the materials were viscous, and the materials were stirred at a high speed for 12 min to obtain the batter of a steamed sponge cake; and
(2) Proofing and Heating of Steamed Sponge Cake Batter:
100 g of the steamed sponge cake batter obtained in step (1) was weighed, the batter was placed in a mold to be oscillated to exhaust, and proofing was performed at a temperature of 37° C. and a humidity of 85% RH for 40 min, the fermented batter was placed in a microwave tunnel heating device to be heated with microwave at a power of 5.1 w/g for 3 min and then naturally cooled for 5 min to obtain the steamed sponge cake with low fructan content.

What is claimed is:

1. A method for reducing fructan content in a food composition, comprising:
    (a) providing a flour, an active dry yeast, and water,
    (b) mixing the flour, the active dry yeast, and water to form a batter,
    (c) proofing the batter in a mold and,
    (d) microwaving the batter at a power of 4.25 to 5.5 Watts per gram of batter and a heating time of 2 to 5 minutes to obtain the food composition,
    wherein the food composition comprises rice and flour,
    wherein step (b), the ratio by weight of the flour, the active dry yeast, and the water is: 180 to 220 grams of flour to 2 to 3 grams of active dry yeast to 120 to 160 grams of water, and
    wherein the fructan content in the food composition does not exceed 0.3 g/100 g DM.
2. The method according to claim 1, wherein the proofing is performed at a temperature of 30° C. to 40° C.
3. The method according to claim 1, wherein the proofing is performed at a humidity of 70% to 90% Relative Humidity (RH).
4. The method according to claim 1, wherein the proofing time is 40 to 60 minutes.
5. The method according to claim 1, wherein step (b) further comprises adding baking powder to the batter.
6. The method according to claim 5, wherein the ratio of the portions by weight of the flour and the baking powder is 180 to 220 gram flour portions to 0.8 to 1.2 gram baking powder portions.
7. The method according to claim 1, wherein the food composition is a steamed sponge cake.
8. The method according to claim 1, wherein the microwave heating of the batter is at a power of 5.1 Watts per gram of batter.
9. The method according to claim 1, further comprising adding a commercial invertase to the batter at 20 to 40 units per gram of the flour.

* * * * *